United States Patent [19]

Collart

[11] Patent Number: 4,709,540
[45] Date of Patent: Dec. 1, 1987

[54] MOWING DEVICE

[75] Inventor: Johannes A. Collart, Heeze, Netherlands

[73] Assignee: P. J. Zweegers en Zonen, B.V., Geldrop, Netherlands

[21] Appl. No.: 788,719

[22] Filed: Oct. 17, 1985

[30] Foreign Application Priority Data

Oct. 25, 1984 [NL] Netherlands ............... 8403245

[51] Int. Cl.$^4$ ............................................. A01D 34/66
[52] U.S. Cl. ........................................... 56/13.6; 56/6
[58] Field of Search .................................. 56/6, 13.6

[56] References Cited

U.S. PATENT DOCUMENTS

| | | | |
|---|---|---|---|
| 3,513,648 | 5/1970 | Kline et al. | 56/13.6 |
| 3,524,306 | 8/1970 | Reber | 56/13.6 |
| 4,149,359 | 4/1979 | van der Lely | 56/13.6 |
| 4,231,216 | 11/1980 | Weber | 56/13.6 |
| 4,428,185 | 1/1984 | Toillie et al. | 56/13.6 |
| 4,443,998 | 4/1984 | Neuerburg | 56/13.6 |
| 4,476,666 | 10/1984 | van der Lely | 56/13.6 |
| 4,499,711 | 2/1985 | McLean | 56/13.6 |

FOREIGN PATENT DOCUMENTS

| | | | |
|---|---|---|---|
| 1813612 | 8/1978 | Fed. Rep. of Germany | 56/13.6 |
| 2030435 | 4/1980 | United Kingdom | 56/13.6 |
| 2033198 | 5/1980 | United Kingdom | 56/13.6 |
| 2068206 | 8/1981 | United Kingdom | 56/13.6 |

Primary Examiner—Paul J. Hirsch
Attorney, Agent, or Firm—Edmund M. Jaskiewicz

[57] ABSTRACT

A mowing device has a number of adjacent cutting elements rotatable around upwardly extending axes of rotation. The cutting elements are supported by an elongated hollow casing located under the cutting elements. Transmission elements for driving at least some of the cutting elements are located in the casing. A reinforcing beam, extending along the rear side of the casing, has been fixed to said casing. The rear ends of tensioned resilient straps have been fixed to the reinforcing beam. The straps extend transverse to the beam and under the casing and are joined to the casing near their front ends at the side of the casing turned away from the reinforcing beam.

8 Claims, 6 Drawing Figures

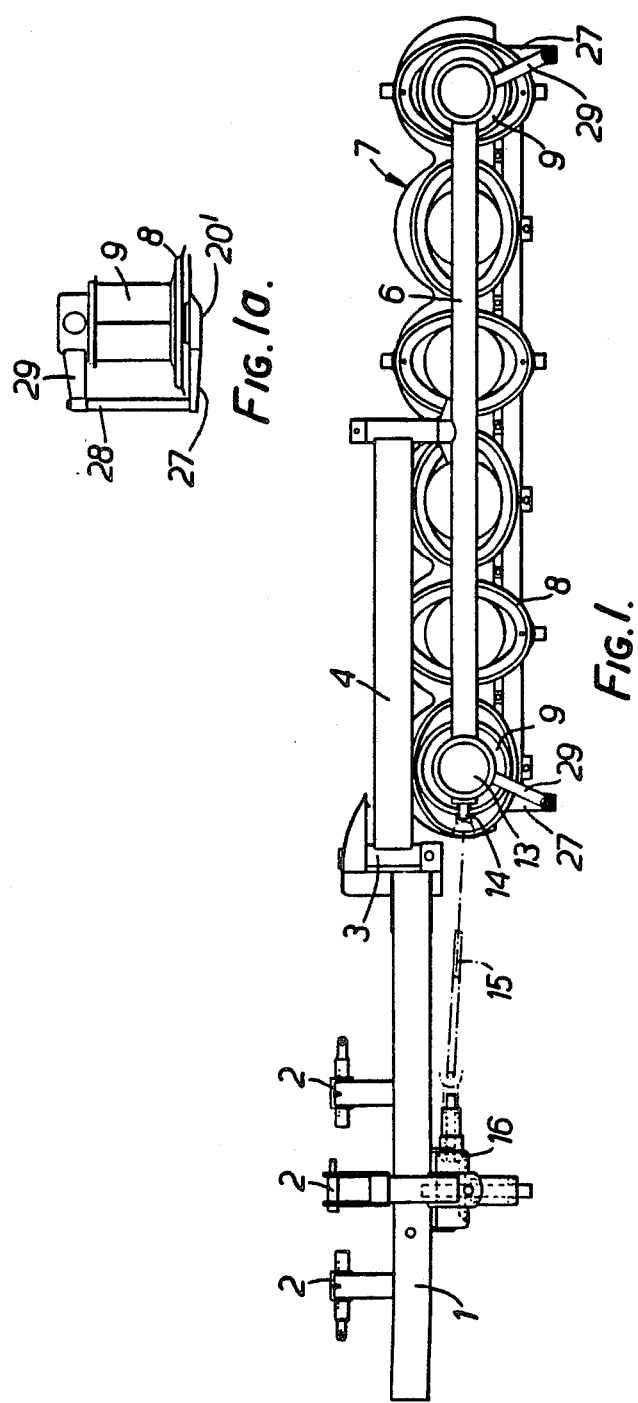

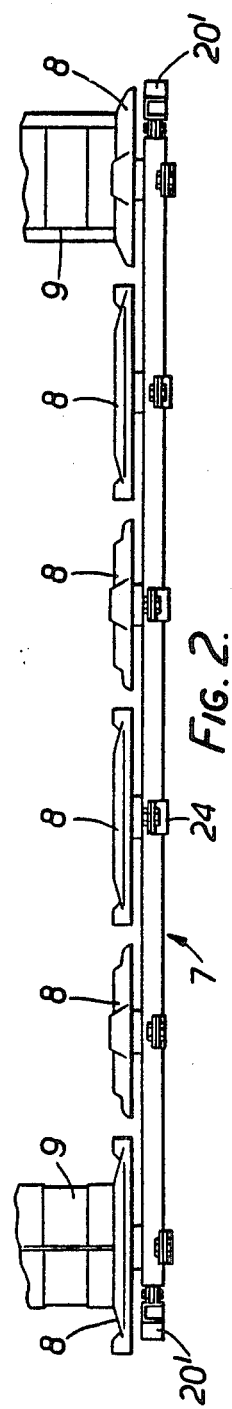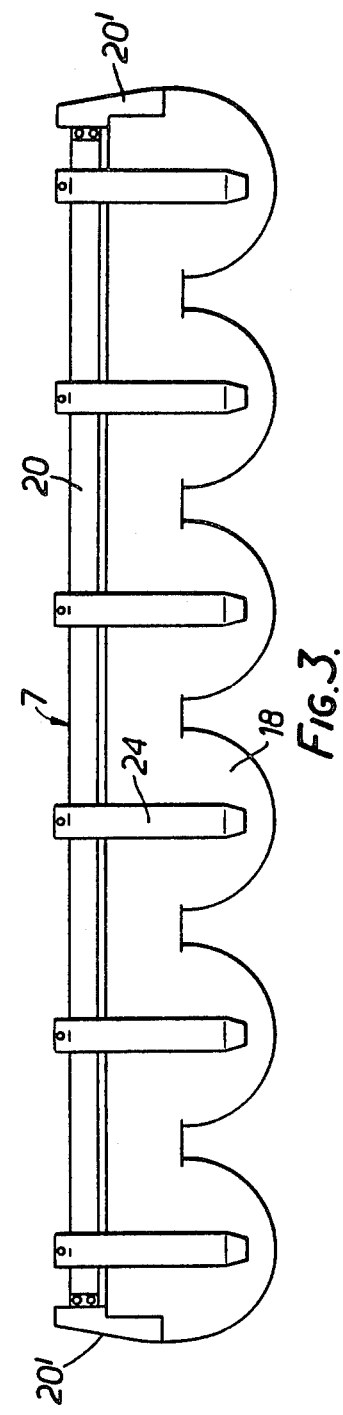

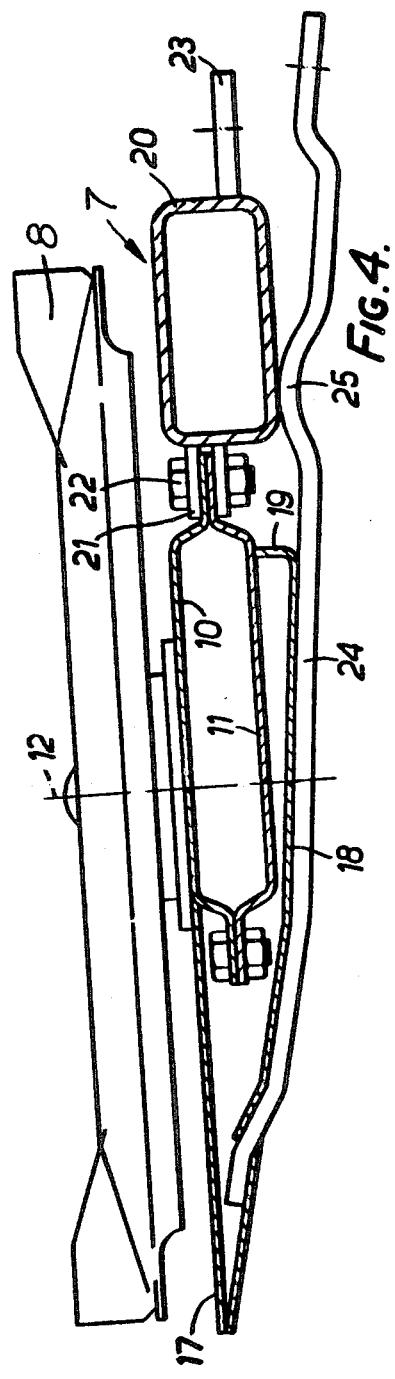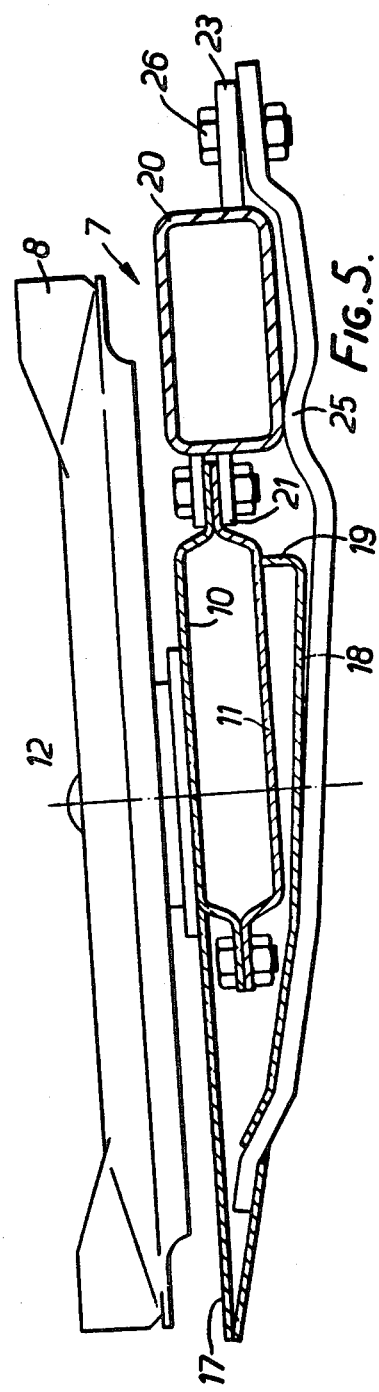

MOWING DEVICE

The invention relates to a mowing device provided with a number of adjacent cutting elements rotatable around upwardly extending axes of rotation, said cutting elements being supported by an elongated hollow casing located under the cutting elements, in which casing transmission elements for driving at least some of the cutting elements are located.

Such mowing devices are generally used at present. In order to achieve an adequate mowing action the casing in which the transmission elements are located, has to be constructed relatively low, so that said casing is not particularly rigid. For achieving an adequate mowing action it is furthermore necessary that the axes of rotation of the cutting elements extend to the fore, sloping upwards at a certain angle.

When using such mowing devices, usually coupled to a tractor, high speeds are generally used and practice has shown that when the casing located under the cutting elements thereby touches roughnesses on the ground said casing easily deforms, whether or not permanently, as a result of which the correct position of the cutting elements is lost and the crops are no longer cut in the desired regular manner.

According to the invention now a reinforcing beam, extending along the rear side of the casing, has been fixed to said casing, whilst the rear ends of tensioned resilient straps have been fixed to the reinforcing beam, said straps extending transverse to the beam and to the fore under the casing and being joined to the casing near their front ends at the side of the casing turned away from the reinforcing beam.

When using the construction according to the invention the reinforcing beam will oppose bending of the casing around an axis extending transverse to the longitudinal direction of the casing. Furthermore the tensioned straps apply a torque around the longitudinal axis of the casing such that said torque counteracts upward forces applied to the front ends of the casing and therewith opposes undesired deformations of the casing.

In this manner an effective reinforcement of the casing can be achieved, without resulting in an undesired increase of the construction height of the parts of the mowing device located under the cutting elements.

The invention will be more fully explained hereinafter with reference to an embodiment of the construction according to the invention illustrated in the accompanying figures.

FIG. 1 is a diagrammatic top view of a mowing device according to the invention.

FIG. 1a is a side view of FIG. 1.

FIG. 2 is a view on a larger scale of a portion of the cutter bar of the device illustrated in FIG. 1, seen according to the arrow II in FIG. 1.

FIG. 3 is a bottom view of FIG. 2.

FIG. 4 illustrates on a larger scale a cross-section of the cutter bar with a resilient strap in the position for fixing to the reinforcing beam.

FIG. 5 illustrates a section corresponding with FIG. 4, whereby, however, the rear end of the resilient strap has been fixed to the reinforcing beam.

The device illustrated in FIG. 1 comprises a frame 1, which is provided with coupling elements 2 known by themselves, by means of which the frame can be coupled in the usual manner to the three-point lift of a tractor or the like.

At one side of the frame an outer end of a connecting beam 4 has been pivotally coupled to the frame 1 by means of a horizontally extending hinge pin 3. Pivotally coupled to the outer end of the connecting beam 4 turned away from the frame, by means of an axis 5 extending parallel to the hinge pin 3 is a supporting beam 6 extending parallel, in top view, to the connecting beam 4.

Located under and parallel to the supporting beam is a frame portion 7, to be further described hereinafter, which serves to support cutting elements 8 rotatable around upwardly extending axes of rotation and located above said frame portion. Thereby the supporting beam 6 is joined to the frame portion 7 by means of axes running through the outer cutting elements 8 provided with drums 9 (FIG. 2).

As appears in particular from FIG. 2 only the outer cutting elements 8 are provided with drums 9, whilst the cutting elements 8 located between the cylinders have been constructed disc-shaped.

As appears from FIGS. 2-5 the frame portion 7 located under the cutting elements 8 comprises a casing formed by two half shells 10 and 11 in the illustrated embodiment, said casing extending under all cutting elements 8 and accommodating driving elements not further illustrated, such as gear wheels, for driving the cutting elements 8, which in use are rotatable around axes of rotation 12 extending to the fore, sloping upwards (FIG. 4). Said transmission elements, located in the casing 10, 11, are driven via a shaft which extends through the left hand drum 9, seen in FIG. 1, and whose upper end, via a gear accomodated in a casing 13 located above the cylinder, has been coupled with a shaft 14 protruding from the casing 13 and being aligned with the supporting beam 6. Said shaft 14 has been coupled with a telescopic intermediate shaft 15 to a gear 16 mounted on the frame 1, which can be driven, in a manner known by itself, from the power take-off shaft of a tractor or the like via an intermediate shaft.

Furthermore plates 17 have been fixed to the illustrated mowing device under the cutting elements 8 and in front of the casing 10,11, guarding said cutting elements at their bottom ends, said plates 17 having a more or less semi-circular shape as is particularly apparent from FIG. 3.

Joining the boundary edge of each guard plate 17 is a plate 18 located under said guard plate 17, extending to the rear, sloping downwards, from the front edge of the guard plate 17 to near the rear side of the casing 10,11, and being joined there to the bottom shell 11 of the casing 10, 11 by means of an upwardly bent edge 19.

The plate 18 extends across the entire length of the casing 10, 11, whereby the shape of the front edge of said plate 18 is adapted to the configuration of the boundary edges of the guard plates 17 located adjacent to each other.

Behind the casing 10, 11, a reinforcing beam 20, extending across the entire length of the casing 10, 11 and being tubular in the illustrated embodiment, has been provided. Regularly spaced protruding ears 21 have been provided to the front side of the reinforcing beam 20, between which ears 21 the rear flanges of the half shells 10, 11 are located. Thereby the ears 21 and the shells are clamped against each other by means of bolts 22 put through the ears and through the flanges of the shells 10 and 11.

Between the ends of the beam 20 and the ends of the casing 10, 11 there has been provided a rigid connection by means of skids 20' extending between said ends. To the skids 20' there have been fixed arms 27 connected to arms 29 fixed to the casings 13 by means of rods 28.

Provided to the rear side of the reinforcing beam 20 have been provided also a number of protruding ears 23 and that, as appears in particular from FIGS. 2 and 3, near each vertical plane extending through the axis of rotation of a cutting element and perpendicular to the longitudinal direction of the reinforcing beam 20.

As further appears from FIG. 2 the ears 23 located near the outer cutting elements 8 are thereby located lowest, the adjacent ears a little higher whereas the ears located near the two middle cutting elements are located highest in this embodiment.

As further appears from the figures a slotted hole has been provided near the foremost part of each guard plate 17 into the plate 18 located under said plate 17 by forming a cut and pressing upwards of the portion of the plate 18 located behind said cut. In the hole thus formed the bent front end of a strap 24 made of spring steel is inserted, said strap extending to the rear under the casing 10,11, such that the rear end of the strap is located near an ear 23 fixed to the reinforcing beam 20.

As appears from FIGS. 4 and 5 the strap thereby butts against the bottom side of the plate 18. The portion of the strap 24 extending behind the bent edge of the plate 18 is provided with an upwardly continued bend 25, which butts against the bottom side of the reinforcing beam 20.

In untensioned condition it will be possible to mount the strap in the position illustrated in FIG. 4. Following that the rear end of the strap 24 may be fixed to a relevant ear 23 by means of a bolt 26, which for that purpose may be put through a hole provided in the relevant ear 23 and a hole provided in the outer end of the relevant strap. By tightening the bolt 26 the resilient strap may be bent to the position illustrated in FIG. 5 in which position the resilient strap will be under pre-tension. This is the normal position taken by the strap.

It will be apparent that the reinforcing beam 20 reinforces the casing 10,11 against bending around an axis extending transverse to the longitudinal direction of the casing 10,11. Furthermore the pre-tensioned straps apply a torque directed around the longitudinal axis of the casing and being anti-clockwise to the casing 10,11, which torque is of a magnitude such that said torque tries to keep the casing 10,11 in the correct operating position. Forces applied to the casing when being used, e.g. because the front end of the beam or the plates 17,18 joined to it strike obstacles will try to deform the casing by a clockwise twisting of the casing around its longitudinal axis. Said forces are now counteracted when using the construction according to the invention by the pre-tensioned straps 24. Therefore it will be apparent that by using the combination of the reinforcing beam 20 and the resilient straps 24 the casing 10, 11 is both reinforced against bending around an axis transverse to it longitudinal axis and against twisting around its longitudinal axis.

When the leaf springs are being mounted the outer resilient straps located near the supporting ends of the casing will already twist the casing somewhat around its longitudinal axis on pre-tensioning. This phenomenon is increased by the straps located more to the inner side. In order to be able to effect an at least substantially equal pre-tensioning in all straps the ears located near the center of the casing have been located higher than the ears located further from the center. Thereby it is possible that in the starting position the center of the casing is twisted a little more around the longitudinal axis of the casing than the outer ends in the illustrated embodiment, but this difference in twist will be eliminated when the beam rests with its own weight on the ground.

Although hereinabove and in the claims mention is made of resilient straps it will be obvious that within the spirit and scope of the invention also other means providing a pre-tension against twist of the casing around its longitudinal axis may be used.

I claim:

1. A mowing device having an elongated hollow casing disposed transverse to a direction of movement of the moving device, a plurality of adjacent cutting elements rotatable around upwardly extending axes of rotation and supporting upon said casing, transmission means for driving at least some of said cutting elements disposed in said casing, a reinforcing beam extending along a rear side of said casing with respect to said direction of movement and attached to said casing, a plurality of tensioned resilient straps extending transversely to said beam and underneath said casing, said straps having rear ends attached to said reinforcing beam and having front ends connected to a side of said casing away from said reinforcing beam such that a torque is applied to the casing to counteract any torsional movement of the casing during mowing.

2. Mowing device as claimed in claim 1, each of said straps being arranged near a vertical plane extending through the axis of rotation of a cutting element, perpendicular to the longitudinal direction of the casing.

3. Mowing device as claimed in claim 1 and a guard plate under the front side of each cutting element, the front end of the resilient strap joined to the casing is located near the front side of the guard plate.

4. Mowing device as claimed in claim 3, wherein under the guard is a plate extending to the rear, sloping downwards, as far as under the casing, said plate being provided near its front end with a hole for the passage of the front end of the resilient strap.

5. Mowing device as claimed in claim 1 wherein the resilient strap is provided between its outer ends with an upwardly extending bend which butts against the bottom side of the reinforcing beam.

6. Mowing device as claimed in claim 1 wherein the rear end of the resilient strap has been fixed to an ear extending to the rear on the rear side of the beam.

7. Mowing device as claimed in claim 1 wherein the casing is supported at least near an end, the pre-tension in a resilient strap located near the supported end of the casing is equal to the pre-tension of a resilient strap located further from said supported end.

8. Mowing device as claimed in claim 6, wherein the ear fixed to the reinforcing beam and to which has been connected the rear end of the resilient strap has been provided higher in proportion as the ear in question is located further away from the supported end of the cutter bar.

* * * * *